US010363852B2

(12) United States Patent
Strumolo et al.

(10) Patent No.: US 10,363,852 B2
(45) Date of Patent: Jul. 30, 2019

(54) APPARATUS AND METHOD FOR CUSTOMIZING A VEHICLE SEAT

(71) Applicant: Ford Global Technologies, LLC, Dearborn, MI (US)

(72) Inventors: Gary Steven Strumolo, Canton, MI (US); Jeroen Lem, Maastricht (NL)

(73) Assignee: Ford Global Technologies, LLC, Dearborn, MI (US)

( * ) Notice: Subject to any disclaimer, the term of this patent is extended or adjusted under 35 U.S.C. 154(b) by 70 days.

(21) Appl. No.: 15/266,178

(22) Filed: Sep. 15, 2016

(65) Prior Publication Data
US 2018/0072199 A1  Mar. 15, 2018

(51) Int. Cl.
*B60N 2/90* (2018.01)
*B60N 2/66* (2006.01)
*B60N 2/806* (2018.01)
*B60N 2/00* (2006.01)
*B60N 2/02* (2006.01)
*B60N 2/22* (2006.01)

(52) U.S. Cl.
CPC .............. *B60N 2/914* (2018.02); *B60N 2/002* (2013.01); *B60N 2/0244* (2013.01); *B60N 2/22* (2013.01); *B60N 2/665* (2015.04); *B60N 2/806* (2018.02); *B60N 2/99* (2018.02); *B60N 2002/0268* (2013.01)

(58) Field of Classification Search
CPC ........ B60N 2/002; B60N 2/0244; B60N 2/22; B60N 2/665; B60N 2/806; B60N 2/914; B60N 2002/0268; B60N 2/99
See application file for complete search history.

(56) References Cited

U.S. PATENT DOCUMENTS

| | | | | | |
|---|---|---|---|---|---|
| 2,938,570 A | * | 5/1960 | Flajole | ................ | A47C 27/081 137/861 |
| 3,330,598 A | * | 7/1967 | Whiteside | ................ | A47C 4/54 297/284.3 |
| 4,634,083 A | * | 1/1987 | McKinnon | ......... | B64D 11/0689 244/122 R |
| 4,634,179 A | * | 1/1987 | Hashimoto | ............ | A47C 7/467 297/284.3 |
| 4,655,505 A | * | 4/1987 | Kashiwamura | ........ | A47C 7/467 297/284.6 |
| 4,707,027 A | * | 11/1987 | Horvath | ................ | B60N 2/914 297/284.6 |
| 4,707,931 A | * | 11/1987 | Stevenson | ............... | F26B 3/082 34/368 |
| 4,720,146 A | * | 1/1988 | Mawbey | ................ | B60N 2/914 297/409 |

(Continued)

FOREIGN PATENT DOCUMENTS

WO     9837790 A1    9/1998
WO     0100132 A2    1/2001

*Primary Examiner* — James M Ference
(74) *Attorney, Agent, or Firm* — Vichit Chea; Price Heneveld LLP

(57) ABSTRACT

A vehicle seat includes a group of first inflatable bladders, each first bladder having a respective first valve coupled therewith and a pump coupled with each of the first valves. The seat further includes a controller in communication with the pump and with the first valves to cause the pump to inflate the first group of bladders to a predetermined pressure and to close the valves to maintain a subsequent inflation level of each of the first bladders.

11 Claims, 7 Drawing Sheets

(56) References Cited

U.S. PATENT DOCUMENTS

| | | | | |
|---|---|---|---|---|
| 4,722,550 A * | 2/1988 | Imaoka | A47C 7/022 | 280/727 |
| 4,833,614 A * | 5/1989 | Saitoh | B60N 2/0224 | 296/65.16 |
| 4,840,425 A * | 6/1989 | Noble | A47C 7/467 | 297/284.1 |
| 4,915,124 A * | 4/1990 | Sember, III | A47C 7/467 | 137/223 |
| 4,981,131 A * | 1/1991 | Hazard | A47C 4/54 | 128/118.1 |
| 5,082,326 A * | 1/1992 | Sekido | B60N 2/914 | 297/284.6 |
| 5,127,708 A * | 7/1992 | Kishi | A61B 5/18 | 297/284.1 |
| 5,129,704 A * | 7/1992 | Kishi | B60N 2/0224 | 297/284.1 |
| 5,135,282 A * | 8/1992 | Pappers | B60N 2/914 | 297/284.3 |
| 5,137,329 A * | 8/1992 | Neale | A47C 7/467 | 297/284.1 |
| 5,176,424 A * | 1/1993 | Tobita | A47C 27/082 | 297/284.1 |
| 5,190,348 A * | 3/1993 | Colasanti | A47C 7/467 | 297/284.6 |
| 5,263,765 A * | 11/1993 | Nagashima | A47C 7/467 | 297/284.6 |
| 5,283,735 A * | 2/1994 | Gross | A47C 4/54 | 600/587 |
| 5,320,409 A * | 6/1994 | Katoh | B60N 2/0232 | 297/284.6 |
| 5,373,595 A * | 12/1994 | Johnson | A61G 7/05769 | 285/361 |
| 5,558,398 A * | 9/1996 | Santos | A47C 4/54 | 297/284.3 |
| 5,570,716 A * | 11/1996 | Kamen | B60N 2/4415 | 137/223 |
| 5,587,933 A * | 12/1996 | Gross | A61B 5/1036 | 297/284.3 |
| 5,658,050 A * | 8/1997 | Lorbiecki | B62J 1/12 | 297/452.41 |
| 5,707,109 A * | 1/1998 | Massara | B60N 2/914 | 297/284.9 |
| 5,762,618 A * | 6/1998 | Yamanaka | A47C 4/54 | 601/148 |
| 5,904,219 A * | 5/1999 | Anahid | A47C 31/126 | 180/273 |
| 5,979,585 A * | 11/1999 | Van Voorhies | B60N 2/002 | 180/273 |
| 6,014,784 A * | 1/2000 | Taylor | A61G 7/05776 | 297/284.6 |
| 6,037,731 A * | 3/2000 | Fruehauf | B60N 2/0244 | 318/468 |
| 6,058,341 A * | 5/2000 | Myers | B60N 2/002 | 177/144 |
| 6,088,642 A * | 7/2000 | Finkelstein | B60N 2/002 | 701/49 |
| 6,088,643 A * | 7/2000 | Long | A47C 4/54 | 701/49 |
| 6,092,249 A * | 7/2000 | Kamen | A47C 4/54 | 297/284.3 |
| 6,203,105 B1 * | 3/2001 | Rhodes, Jr. | A47C 4/54 | 297/284.6 |
| 6,273,810 B1 * | 8/2001 | Rhodes, Jr. | A47C 4/54 | 454/120 |
| 6,353,207 B1 * | 3/2002 | Burt | A47C 4/54 | 219/217 |
| 6,422,087 B1 * | 7/2002 | Potter | B60N 2/0232 | 73/731 |
| 6,427,538 B1 * | 8/2002 | Potter | A47C 7/467 | 73/706 |
| 6,578,916 B2 * | 6/2003 | Longhi | B60N 2/0224 | 297/284.3 |
| 6,629,715 B2 * | 10/2003 | Oh | B60N 2/0224 | 296/63 |
| 6,682,059 B1 * | 1/2004 | Daniels | A47C 4/54 | 267/131 |
| 6,782,573 B2 * | 8/2004 | Odderson | A47C 4/54 | 5/654 |
| 6,851,755 B2 * | 2/2005 | Dinkel | A47C 4/54 | 297/452.48 |
| 6,950,776 B2 * | 9/2005 | Lich | B60N 2/002 | 177/144 |
| 7,093,898 B2 * | 8/2006 | Ladron De Guevara | A47C 4/54 | 297/284.6 |
| 7,152,920 B2 * | 12/2006 | Sugiyama | B60N 2/002 | 297/284.6 |
| 7,237,443 B2 * | 7/2007 | Speckhart | B60N 2/002 | 180/273 |
| 7,267,404 B2 * | 9/2007 | Kern | F16K 11/0716 | 297/284.6 |
| 8,181,292 B1 * | 5/2012 | Pellettiere | B60N 2/42709 | 5/654 |
| 8,398,170 B2 * | 3/2013 | Walker | A47C 7/022 | 297/284.1 |
| 8,616,654 B2 * | 12/2013 | Zenk | B60N 2/914 | 297/452.41 |
| 8,702,120 B2 * | 4/2014 | Kalisz | B60N 2/914 | 280/730.1 |
| 8,801,104 B2 * | 8/2014 | Di Giusto | B60N 2/70 | 297/284.6 |
| 8,807,650 B2 * | 8/2014 | Ascher | B60N 2/0232 | 297/284.3 |
| 8,868,244 B2 * | 10/2014 | Genaro | G05D 7/06 | 5/655.3 |
| 9,090,185 B2 * | 7/2015 | McMillen | B60N 2/02 | |
| 9,174,604 B2 * | 11/2015 | Wellhoefer | B60R 21/013 | |
| 9,283,875 B1 * | 3/2016 | Pellettiere | B60N 2/4415 | |
| 9,340,131 B1 * | 5/2016 | Kolich | B60N 2/4864 | |
| 9,840,171 B2 * | 12/2017 | Arant | B60N 2/4415 | |
| 2003/0230917 A1 * | 12/2003 | Dorfler | B60N 2/914 | 297/284.1 |
| 2004/0068801 A1 * | 4/2004 | Wilkinson | A47C 27/082 | 5/713 |
| 2010/0117414 A1 * | 5/2010 | Hwang | B60N 2/665 | 297/217.3 |
| 2010/0244504 A1 * | 9/2010 | Colja | A61H 9/0078 | 297/180.1 |
| 2010/0289302 A1 * | 11/2010 | Cheng | B60N 2/002 | 297/180.12 |
| 2012/0223554 A1 * | 9/2012 | Lem | B60N 2/914 | 297/217.1 |
| 2013/0285426 A1 * | 10/2013 | Arant | B60N 2/62 | 297/284.1 |
| 2014/0032043 A1 * | 1/2014 | Line | B60N 2/976 | 701/36 |
| 2015/0210192 A1 * | 7/2015 | Benson | B60N 2/914 | 297/217.2 |
| 2015/0251573 A1 * | 9/2015 | Misch | B60N 2/665 | 297/452.41 |
| 2015/0277754 A1 * | 10/2015 | Misch | B60N 2/448 | 715/769 |
| 2016/0207429 A1 * | 7/2016 | Fitzpatrick | B60N 2/646 | |

* cited by examiner

US 10,363,852 B2

APPARATUS AND METHOD FOR CUSTOMIZING A VEHICLE SEAT

FIELD OF THE INVENTION

The present invention generally relates to a customizable vehicle seat. In particular, a vehicle seat is customized by redistributing air among a group of pre-pressurized air bladders.

BACKGROUND OF THE INVENTION

Seats with pneumatic bladders or other inflatable elements have been developed to allow users to customize the contour of a vehicle seat to improve comfort and support. Available seats may have a selection of different air bladders integrated into the seat structure to enable contour changes and/or massage functions. The associated seat or an adjacent area of the vehicle may include an interface with buttons that allow the pressure of the individual bladders or groups of bladders to be adjusted up and down. In this manner, a user can change the pressure in each of the bladders to arrive at the desired contour or support profile. However, many seats are providing increased numbers of bladders, which while allowing greater fine-tuning ability, can result in a tedious and time-consuming adjustment process.

SUMMARY OF THE INVENTION

According to one aspect of the present disclosure, a vehicle seat includes a group of first inflatable bladders, each first bladder having a respective first valve coupled therewith and a pump coupled with each of the first valves. The seat further includes a controller in communication with the pump and with the first valves to cause the pump to inflate the first group of bladders to a predetermined pressure and to close the valves to maintain a subsequent inflation level of each of the first bladders.

According to another aspect of the present disclosure, a vehicle seat includes a group of first inflatable bladders, each first bladder having a respective first valve coupled therewith and a first manifold coupled with each of the group of first bladders to provide fluidic communication among the first group of bladders when the first valves are in respective open positions. The vehicle seat further includes a pump coupled with the first manifold a first check valve coupled between the pump and the first manifold.

According to another aspect of the present disclosure, a method for adjusting a vehicle seat includes moving each of a set of first valves respectively associated with ones of a group of first bladders into an open position allowing the receipt of air into and fluidic communication among the group of first bladders. The method further includes inflating the first group of bladders to a predetermined pressure and closing each of the set of first valves to maintain an inflation level of each of the first bladders.

These and other aspects, objects, and features of the present invention will be understood and appreciated by those skilled in the art upon studying the following specification, claims, and appended drawings.

DETAILED DESCRIPTION OF THE PREFERRED EMBODIMENTS

Figure 1:
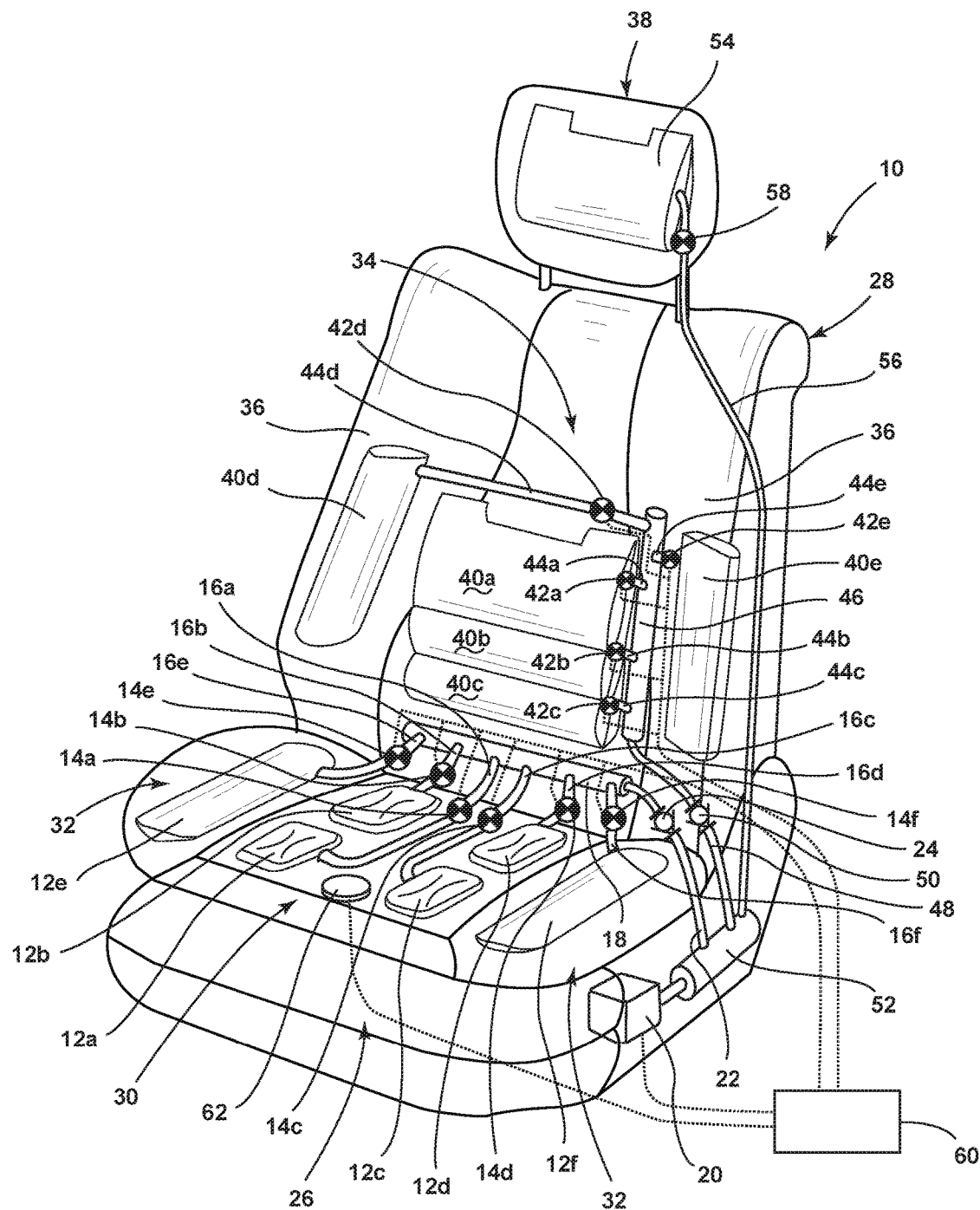
FIG. 1 is a perspective view of a vehicle seat according to an aspect of the disclosure with various internal features thereof shown.

For purposes of description herein, the terms "upper," "lower," "right," "left," "rear," "front," "vertical," "horizontal," "interior," "exterior," and derivatives thereof shall relate to the invention as oriented in FIG. 1. However, it is to be understood that the invention may assume various alternative orientations, except where expressly specified to the contrary. It is also to be understood that the specific devices and processes illustrated in the attached drawing, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise. Additionally, unless otherwise specified, it is to be understood that discussion of a particular feature of component extending in or along a given direction or the like does not mean that the feature or component follows a straight line or axis in such a direction or that it only extends in such direction or on such a plane without other directional components or deviations, unless otherwise specified.

Referring now to FIG. 1, reference numeral 10 generally designates a vehicle seat. Seat 10 includes a group of first inflatable bladders 12 or 40, each of such first bladders 12 or 40 having a respective first valve 14 or 42 coupled therewith. A first manifold 18 or 46 is coupled with each of the group of first bladders 12 or 42 to provide fluidic communication among the group of first bladders 12 or 40 when the first valves 14 or 42 are in respective open positions. A pump 20 is coupled with the first manifold 18 or 46 and a first check valve 24 is coupled between the pump and first manifold 18 or 46.

As described herein, a reference to one or more of valves 14 or 42 in the "open" position indicates that the valve is in a position wherein the bladder 12 or 40 is in fluidic communication with at least one other bladder 12 or 40 within the designated group of bladders 12 or 40. In the depicted embodiment, for example, a three-way valve can be used for valves 14 or 42 with a closed or "hold" position wherein the pressure within bladder 12 or 40 is generally maintained.

Such a valve may also include a "fill" position, wherein bladder 12 or 40 is in fluidic communication with manifold 18 or 46, as well as a "deflate" position, wherein the bladder 12 or 40 communicates with an exhaust port that may, for example be open to the ambient environment. In one possible configuration, the exhaust ports may be fluidically coupled together, by a common line, for example, with a single valve on such line allowing deflation or preventing deflation by closing to ambient air. In such an example, the deflate position could be considered an "open" position within the meaning of this disclosure.

As further shown in FIG. 1, the depicted vehicle seat 10 can be in the form of the illustrated front vehicle seat, which may be useful in either the driver side or passenger side of the associated vehicle, or may similarly be adapted to be used as a middle, third, or rear vehicle seat. As illustrated, seat 10 can include a cushion 26 with a seatback 28 rotatably mounted therewith. In the embodiment shown in FIG. 1, the group of first bladders 12 can be positioned within the seat cushion 26 beneath an exterior coverstock of seat 10. Further, first bladders 12 can be supported by the internal structure of seat 10, including one or more carriers specifically adapted to support and retain the positioning of the respective first bladders 12. An example of such carriers is described in co-pending, commonly-assigned U.S. patent application Ser. No. 14/534,285, the entire disclosure of which is incorporated by reference herein. As further illustrated, cushion 26 may include a central region 30 flanked by a pair of opposite cushion bolsters 32 with the first bladders 12 within the aforementioned group of first bladders 12 being distributed throughout such areas of cushion 26. In the example shown, four of the first bladders, 12a, 12b, 12c, and 12d can be arranged within the cushion central region 30 with additional ones of first bladders 12e and 12d being positioned within respective ones of the cushion bolsters 32. It is noted that other arrangements of such first bladders 12 are possible and can include further configurations depending on the type and construction of seat, as well as the desired inflation characteristics thereof.

First bladders 12 within such varying regions of seat 10 can take on a number of forms that can generally include one or more polymeric (such as plastic) membranes, which may be strategically sealed together to form chambers. Such chambers may be formed in individual bladders 12, as shown, or may include multiple bladders in a single unit of material with appropriate seams in the polymeric material bounding the respective bladders 12. In any such construction, bladders 12 are generally impermeable to air, such that air within a bladder 12 that is in the inflated state remains at the desired inflation level.

As further illustrated in FIG. 1, the seatback 28 can be similarly divided among a central region 34 and outwardly-extending seatback bolsters 36. In one example, the central region 30 may at least coincide with a lumbar area of seatback 28, according to the positioning thereof with respect to an intended user. A headrest 38 may also be affixed with seatback 28, as shown, and may be a separate unit adjustably configured with respect to seatback 28. Alternatively, a headrest 38 may be integrally formed with seatback 28. In an alternative arrangement, the first bladders 12 may be positioned within seatback 28, including within either or both of seatback central region 34 and bolsters 36. In a further example, multiple bladders can be generally permanently interconnected by being fluidically coupled upstream of one of valves 14 or 42. Such interconnected bladders can be configured as the bladders 12e and 12f within bolsters 32, for example.

Figure 2:
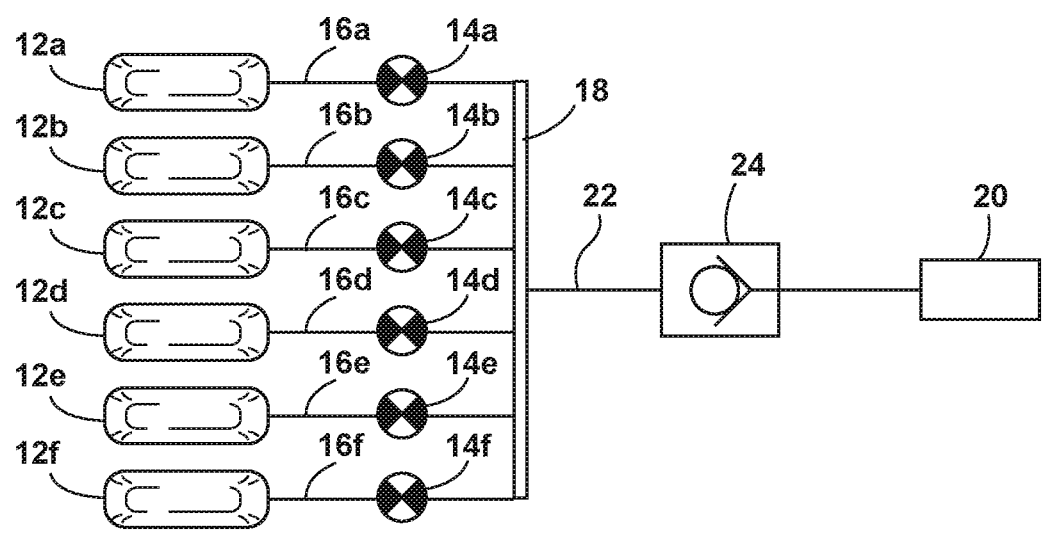
FIG. 2 is a schematic depiction of an air bladder system useable in a variation of the vehicle seat of FIG. 1.

FIG. 2 schematically depicts an arrangement of first bladders 12, of which six first bladders 12a-12f are illustrated, along with corresponding first valves 14a-14f (although more or fewer first bladders and corresponding first valves 14 are possible). FIG. 2 further depicts the fluidic coupling first bladders 12a-12f with pump 20 via manifold 18, as well as the inclusion of check valve 24 in a first collective supply line 22 between pump 20 and manifold 18. By way of example, the depicted arrangement may represent a variation of the above-described arrangement in which first bladders 12a-12f are the only bladders coupled with pump 20, and may include, for example, a variation of the seat 10 depicted in FIG. 1 wherein the depicted first bladders 12a-12f are included within seat cushion 26. As shown, each of first bladders 12a-12f is coupled with manifold 18 by corresponding first individual line segments 16a-16f. Each one of the corresponding first valves 14a-14f is positioned within a corresponding one of the first individual line segments 16a-16f. In various examples, valves 14a-14f can be positioned within first individual line segments 16a-16f or can be separate units that interrupt or otherwise positioned within gaps in the first individual line segments 16a-16f. Still further, first valves 14a-14f may be coupled with either the first bladders 12a-12f at respective inlets thereof or at corresponding outlets of manifold 18, with the first individual line segments 16a-16f coupled between valve and the other of manifold 18 or first bladders 12a-12f. As further depicted in FIG. 2, first collective line segment 22 is coupled between pump 20 and manifold 18 and has a first check valve 24 positioned, as shown, for example, within a portion of first line segment 22. In similar alternative arrangements, check valve 24 can be coupled directly with an outlet of pump 20 or with an inlet to manifold 18. Still further, in an embodiment wherein pump 20 is considered reasonably or fully air-tight, an arrangement can be used that does not include check valve 24 (or check valve 50, as discussed below).

Figure 3:
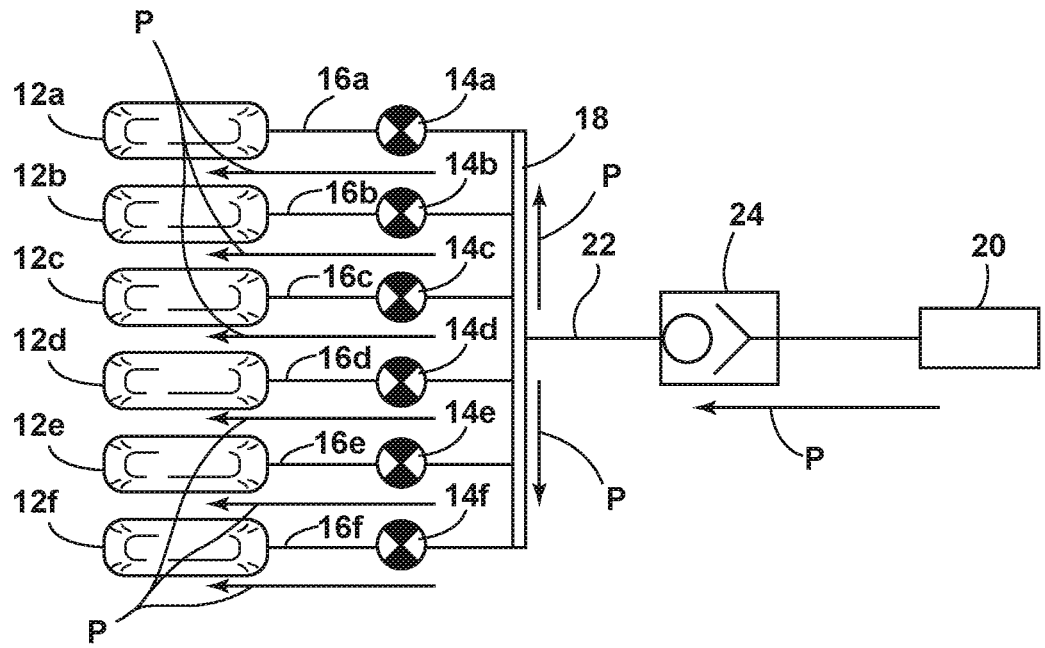
FIG. 3 is the air bladder system of FIG. 2 during an initial inflation stage thereof.

As shown in FIG. 3, in this arrangement, valves 14a-14f can be moved from the closed position of FIG. 2 to an open position such that a flow of air through manifold 18 can further flow into bladders 12a-12f. As illustrated in FIG. 1, valves 14a-14f can be coupled with a controller 60 to control such opening and closing thereof. In this manner, valves 14a-14f can be any of various electro-mechanical valves, including solenoid valves or the like. In a similar manner, controller 60 can be coupled with pump 20 to control the use thereof in providing a flow of air into the manifold 18. As can be seen, air flowing out of out of pump 20 and into first line segment 22 passes through check valve 24. The incorporation of check valve 24 can allow the flow of air P from pump 20 to force check valve 24 to open and allow the air flow from p to pump 20 to flow into manifold 18. Subsequently, the air flow P from pump 20 flows out of manifold 18 and into the individual line segments 16a-16f and through open valves 14a-14f and, subsequently, into first bladders 12a-12f. Still further, the incorporation of check valve 24 prevents backflow of the air from pump 20 against the indicated direction of FIG. 3 because a higher downstream pressure (i.e. within bladders 12a-12f or manifold 18) will cause check valve 24 to close.

Figure 4:
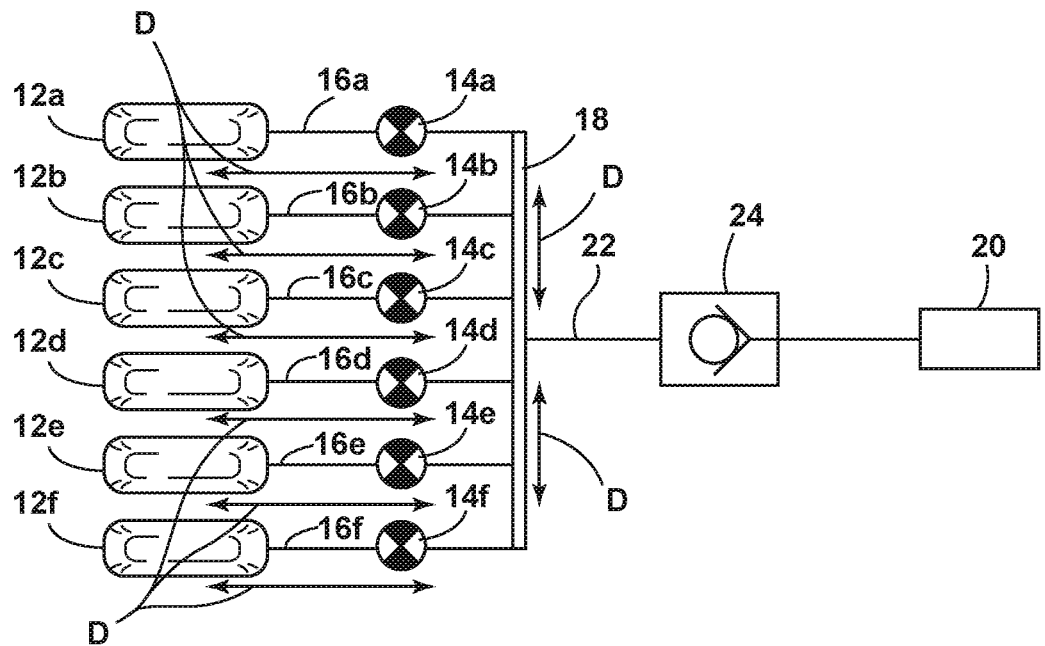
FIG. 4 is the air bladder system of FIG. 2 during a redistribution stage thereof.

When valves 14a-14f are in the open position indicated in FIG. 3, the flow air P from pump 20 into bladders 12a-12f from manifold 18 will generally result in an even distribution of pressure among bladders 12a-12f, as the components upstream of check valve 24, including bladders 12a-12f are all connected with each other in an open network. Accordingly, the particular quantity of air P flowing into bladders 12a-12f will vary based on the size of bladders 12a-12f, among other factors discussed below. Accordingly, as shown in FIG. 4, when pump 20 is deactivated by controller 60, or when the downstream pressure of the air provided by pump 20 exceeds the pressure output of pump 20 itself, check valve 24 will be moved into the closed positioned illustrated in FIG. 4. As further illustrated, controller 60 may maintain valves 14a-14f in the illustrated open positions. Accordingly, the pressure of air within the group of first bladders 12a-12f will remain fixed, as will the quantity of air among the bladders, collectively. With valves 14a-14f open, however, air is free to move through the first individual line segments 16a-16f and through manifold 18 along a distribution path D illustrated in FIG. 4, so long as valves 14a-14d remain open. In this manner, uneven pressure applied externally over the group of first bladders 12a-12f can result in different quantities of air and, accordingly, different inflation levels of each of such bladders 12a-12f as the open unit seeks to equalize the pressure among bladders 12a-12f. In this manner, and as discussed further below, the profile of cushion 26 including first bladders 12a-12f can be adjusted by such pressure-based distribution of air among bladders 12a-12f, such as in response to the profile and seating position of an occupant within seat 10, as discussed further below.

Figure 5:
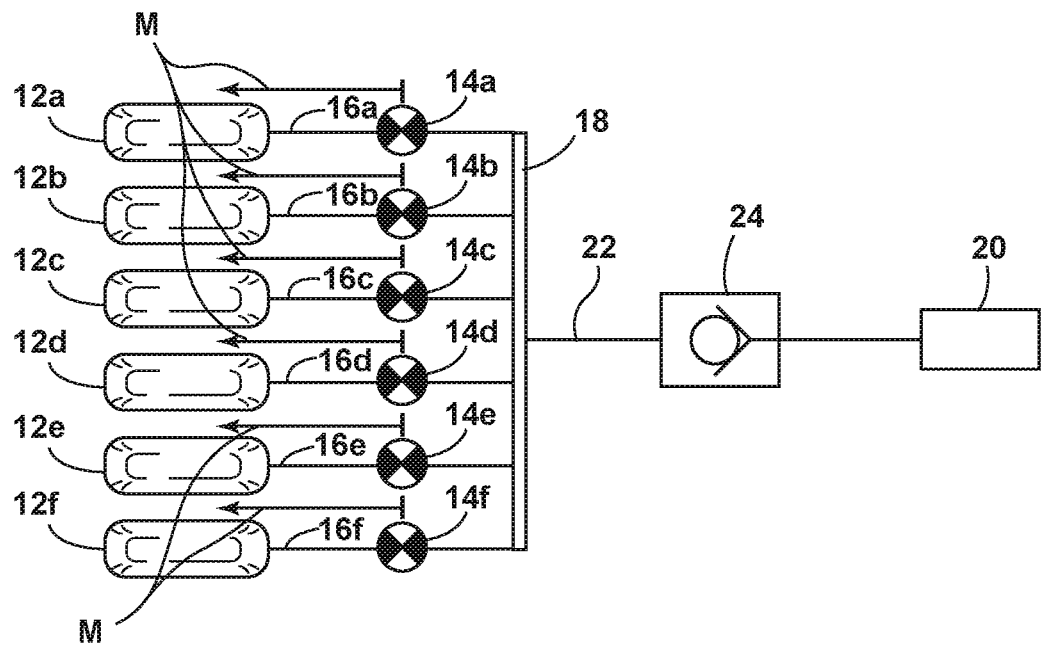
FIG. 5 is the air bladder system of FIG. 2 shown in an air-level maintenance configuration thereof.

As shown in FIG. 5, upon closing of first valves 14a-14f, such as under direction of controller 60, first bladders 12a-12f can be isolated from each other such that the amount of air contained therein is sustained by valves 14a-14f by preventing air flow out of bladders 12a-12f, individually. In this manner, the amount of air in each of such bladders 12a-12f will remain generally constant even during reconfiguration of the various pressures thereover, such as by shifting of the occupant within seat 10, as discussed further below. As discussed above, in an embodiment wherein valves 14 are three-way valves, controller 60 can cause valves 14 to move to the deflate position, to allow pressure to be expelled from first bladders 12a-12f, should it be desired. This can further include opening of a designated exhaust valve when the exhaust ports of valves 14 are interconnected. It is further contemplated that manifold 18 can include an exhaust valve or the like to provide for deflation when valves 14 are two-way valves. Such a valve can be coupled with controller 60 and can be open to the ambient environment with or surrounding seat 10.

Figure 6:
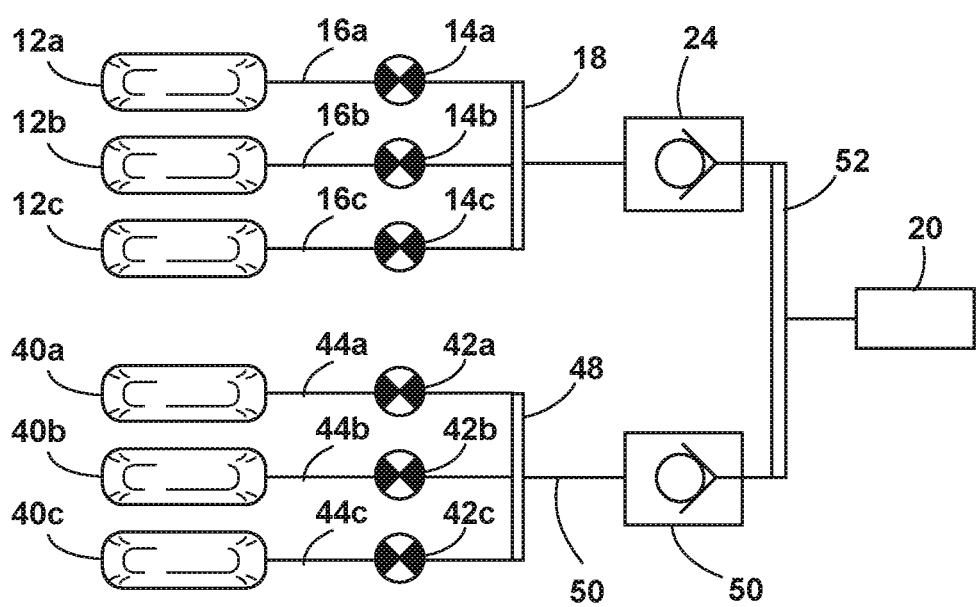
FIG. 6 is a schematic view of a variation of an air bladder system useable in the vehicle seat of FIG. 1.

Referring now to FIG. 6, and with further reference, again, to FIG. 1, vehicle seat 10 may additionally include a group of second inflatable bladders 40, as depicted schematically in FIG. 6 (including second bladders 40a-40c), and as shown within seatback 28 in FIG. 1 (including second bladders 40a-40e). The group of second bladders 40a-40e may be arranged in a similar manner to those positioned within cushion 26. In particular, in the embodiment of FIG. 1, some of second bladders 40a-40c may be positioned within the central region 34 of seatback 28, with additional ones of second bladders 40d and 40e positioned within seatback bolsters 36. In the illustrated embodiment of FIG. 1, the second bladders 40a-40c positioned within seatback central region 34 may be arranged in an overlapping manner within a lumbar area of central region 34, although other arrangements, including arrangements similar to those depicted within cushion 26 may also be possible.

As further shown in FIGS. 1 and 6, each one of the group of second bladders 40 may have respective second valves 42 coupled therewith, including by way of second individual line segments 44. Each of the second individual line segments 44 may, in turn, couple with a second manifold 46 for coupling thereof with pump 20. Similar to first bladders 12a-12f, as discussed above, second manifold 46 may couple with pump 20 by way of second collective line segment 48 having a second check valve 50 therein or otherwise coupled therewith. As further illustrated, in such an arrangement, first collective line segment 22 and second collective line segment 48 may couple with pump 20 via a pump manifold 52 with check valves 24 and 50 being positioned upstream thereof. In this manner, the group of first bladders 12a-12f and the group of second bladders 40a-40e, as depicted in FIG. 1 (as well as first bladder 12a-12c and second bladders 40a-40c in FIG. 6), may form separate networks for distribution of the flow of air thereto in a similar manner to that which is described above in FIGS. 2-5.

In the arrangement shown in FIG. 6, for example, first bladders 12a-12c as well as second bladders 40a-40c may be simultaneously pressurized to a predetermined level using pump 20, with the air flow provided thereby flowing through pump manifold 52 and respective check valves 24 and 50 and through the associated first and second individual line segments 22 and 44 to the corresponding manifolds 18 and 46. Subsequently, the air flow through manifold 18 can pass through valves 14a-14c when in the open state, and into first bladders 12a-12c. Similarly, the air flow through second manifold 46 can pass through second valves 42a-42c when in the open position, and through corresponding second individual line segments 44a-44c and into second bladders 40a-40c. Valves 42a-42c can be electrically connected with controller 60 and can be similar electro-mechanical valves to first valves 14a-14c. Second valves 42a-42c can be controlled separately from first valves 14a-14c such that they can be opened simultaneously with or separately from first valves 14a-14c. In this manner, first bladders 12a-12c can be pressurized simultaneously with or separately from second bladders 40a-40c using a single pump 20. In a similar manner to that which is discussed above with respect to FIG. 5, when the desired pressurization for either or both of first bladders 12a-12c and second bladders 40a-40c are reached, pump 20 can be deactivated, causing check valves 24 and 50 to close and isolating the air within first group of bladders 12a-12c and second group of bladders 40a-40c from each other while still allowing the respective quantities of air to distribute among the respective groups of bladders 12a-12c and 40a-40c.

In the example of FIG. 1, wherein first group of bladders 12a-12f is positioned within cushion 26 and second group of bladders 40a-40e is positioned within seatback 28 the air among such bladders can distribute independently within the cushion 26 and the seatback 28, as the weight of an occupant within seat 10 can cause greater pressure over the first group of bladders 12a-12f and the second group of bladders 40a-40e. The resulting distribution among second group of bladders 40a-40e can be maintained by closing valves 42a-42c in a manner similar to that which is discussed above with respect to first bladders 12a-12f and FIG. 5.

As further shown in FIG. 1, additional single bladders such as headrest bladder 54 can be included within seat 10 with an additional line 56 coupling with pump manifold 52 to provide a flow of air thereto. Further, a valve 58 can be associated with such a bladder 54 to allow for pump 20 provide the flow of air thereto independently from first bladders 12a-12f and/or second bladders 40a-40e. Still further, alternatives of the schematic arrangement depicted in FIG. 6 can include the first bladders 12a-12c being positioned within, for example, central region 30 of cushion 26, and second bladders 40a-40c being located within bolsters 32 of cushion 26. Still further, additional groups of bladders can be incorporated in to vehicle seat 10 by adding additional manifold coupled with corresponding collective air lines and check valves to couple with pump manifold 52.

Figure 7:
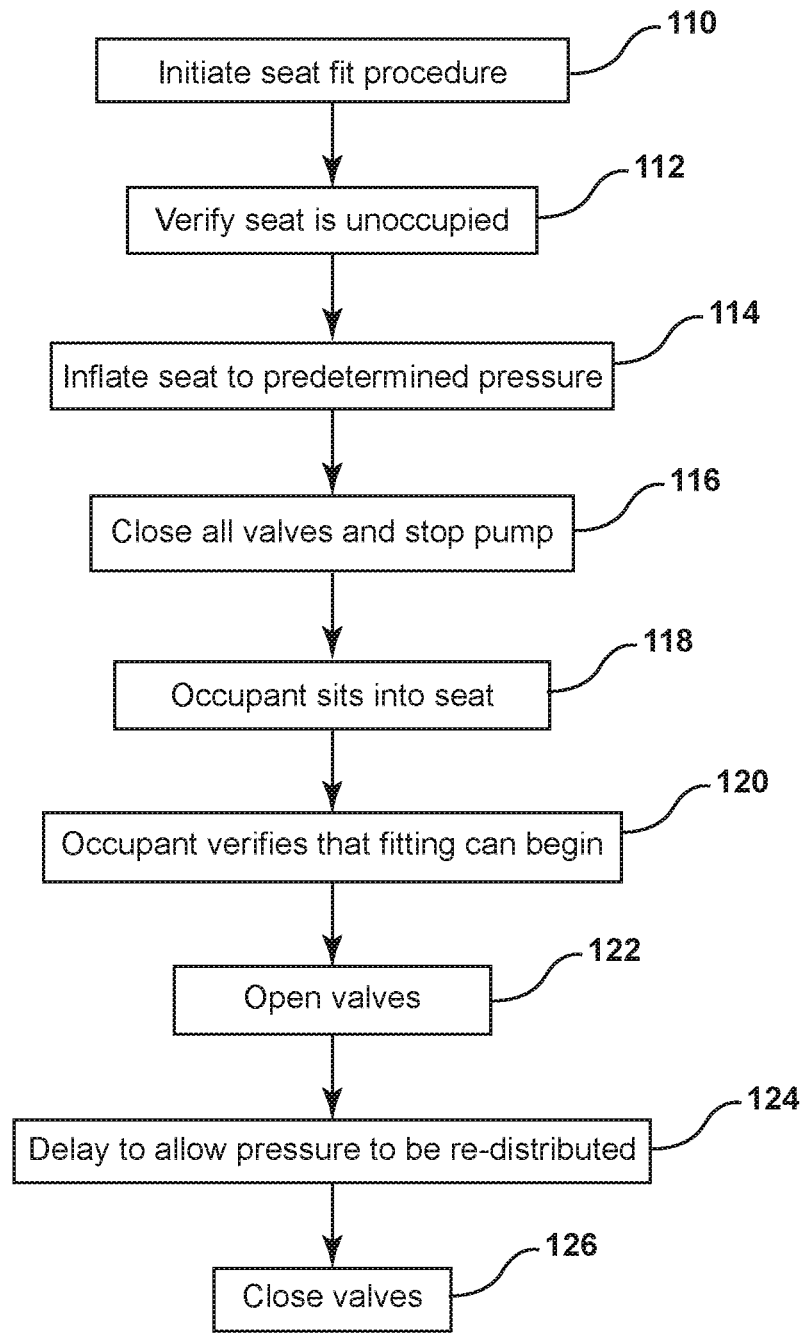
FIG. 7 is a flowchart showing steps in implementing a customization method of the vehicle seat of claim 1.

In an embodiment, a seat, such as seat 10, including the above-described arrangement of first bladders 12 and/or second bladders 40 can be used to provide a customized seating arrangement for an occupant according to the method depicted in FIG. 7. With further reference to FIGS. 8-11, the method can begin with initiation of the procedure (step 110), such as by controller 60. This step can be initiated automatically by controller 60 upon, for example, the vehicle being turned off or at the direction of a user of the vehicle. As shown in FIGS. 1 and 7, seat 10 can further be equipped with an occupant sensor 62 such that controller 60 can determine if seat 10 is occupied or not. As shown in FIG. 7, controller 60 can wait until seat 10 is verified as unoccupied, such as by use of occupancy sensor 62 before continuing with the customization procedure. In this manner, controller 60 can ensure that pressurization of seat 10 can be achieved evenly among bladders 12 and/or 14.

Figure 8:
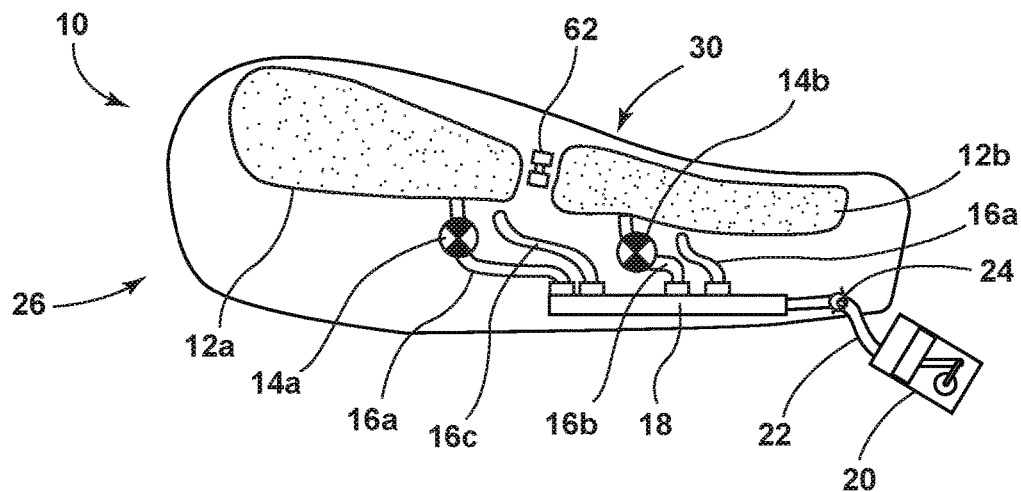
FIG. 8 is a side view of internal structures of a vehicle seat cushion including an air bladder system prior to initiation of the method of FIG. 7.
Figure 9:
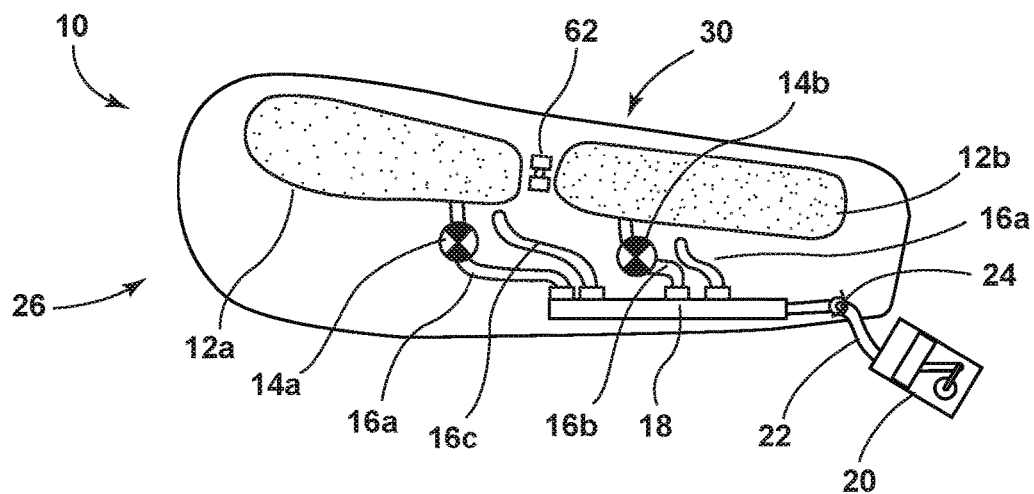
FIG. 9 is the side view of the internal structures of the vehicle seat of FIG. 8 during an inflation step of the method of FIG. 7.

As shown in FIG. 8 when seat 10 is unoccupied first bladders 12a and 12b, as shown in FIG. 8 can maintain a previous arrangement from the customization process described herein, so long as valves 14a and 14b remain in a closed position. It is noted that in FIGS. 8-11 two first bladders 12a and 12b are shown to illustrate application of the described method. It is to be understood, however, that the same principles and actions can apply to a seat 10 with additional bladders and/or groups of bladders, such as that shown in FIG. 1 or in FIG. 2 or 6, as described above. A subsequent customization procedure of seat 10 can seek to reconfigure the configuration of bladders 12a and 12b by first returning such bladders 12a and 12b to a neutral configuration. As shown in FIGS. 7 and 9, the process can, accordingly, being by first valves 14a and 14b being moved into an open position, thereby allowing flow of are into and among first bladders 12a and 12b. Subsequently, controller 60 can direct pump 20 to provide a flow of air to first bladders 12a and 12b through manifold 18 until a desired pressure within first bladders 12a and 12b is reached, as illustrated in FIG. 9.

Figure 10:
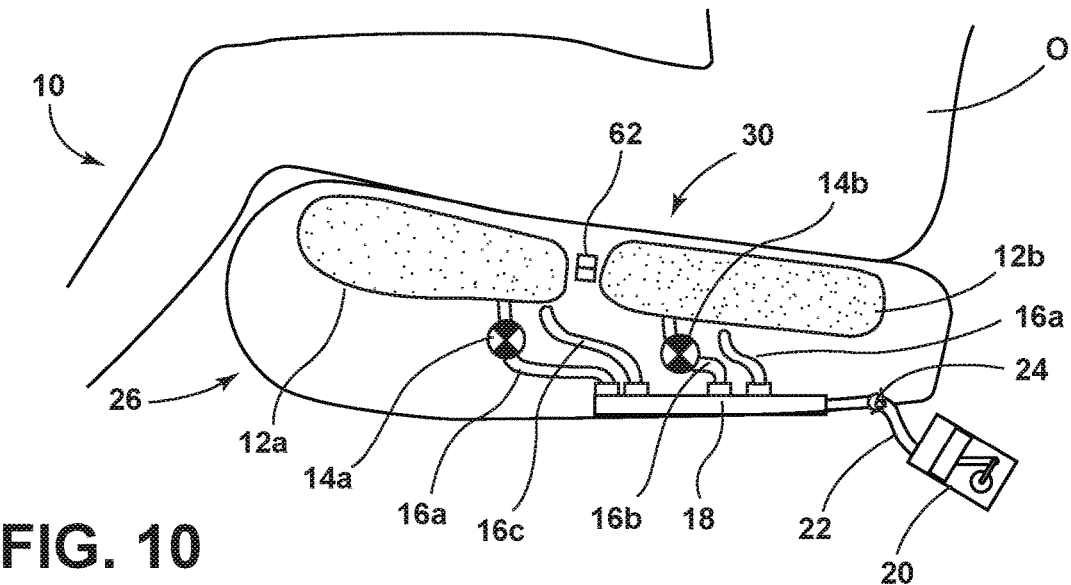
FIG. 10 is the side view of the internal structures of the vehicle seat of FIG. 8 occupied by an occupant.
Figure 11:
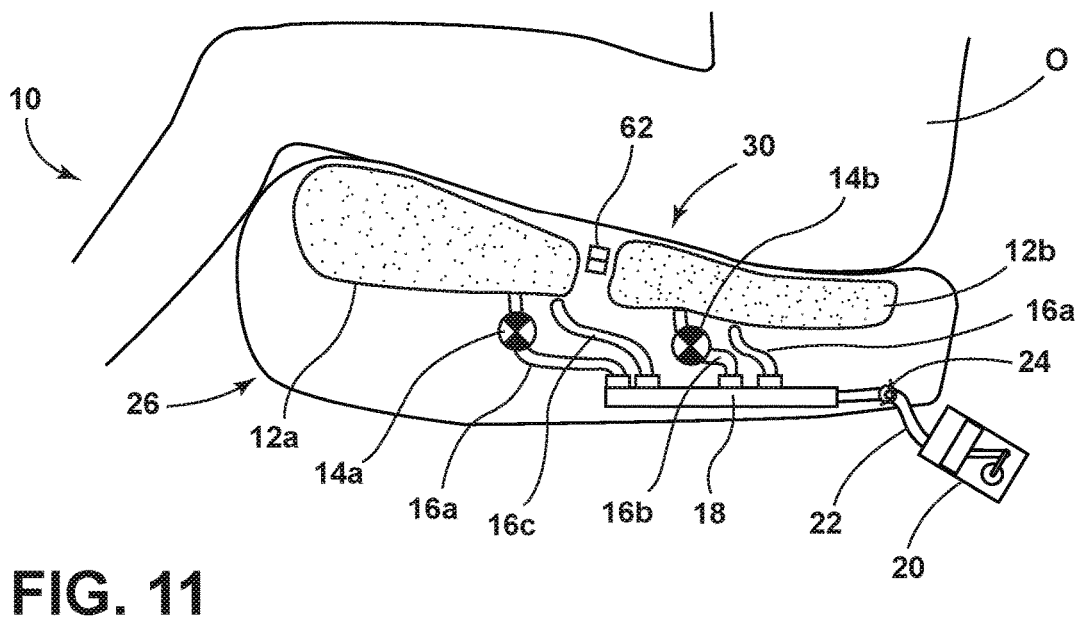
FIG. 11 is the side view of the internal structures of the vehicle seat of FIG. 8 occupied by an occupant and after a redistribution step of the method of FIG. 7.

Once the desired pressure is reached for first bladders 12a and 12b, controller 60 can close valves 14a and 14b and stop pump 20. By closing valves 14a and 14b, the quantities of air within first bladders 12a and 12b achieved during the neutral-state inflation is maintained when a user sits in seat 10 in step 118 and as shown in FIG. 10. As further shown in FIG. 10, the result of an occupant O sitting in seat 10 is that the pressure on one of the first bladders 12a and 12b can become greater than another of bladders 12a or 12b due to uneven weight distribution of occupant O on seat 10. Accordingly, the profile of seat 10, including cushion 26, as depicted in FIG. 10 (as well as in seatback 28 in a similar manner) can be customized. As an initial step the occupant O can be asked if seat configuration according to subsequent method steps can begin. This can be done based on direct input from occupant O such as pressing a designated button or by specific interaction with a vehicle human-machine interface ("HMI") (step 120). When occupant O has verified that the customization process can begin, controller 60 can subsequently open first valves 14a and 14b, thereby allowing redistribution of the air within first bladders 12a and 12b, as described above. As shown in FIG. 11, as a result of valves 14a and 14b being opened the air within bladders 12a and 12b (as well as additional first bladders, such as the first bladders 12a-12f as illustrated in FIG. 1) can be redistributed through manifold 18 such that the pressure within such first bladders 12a and 12b is returned to an equalized state, with additional air flow being provided to areas previously under a lower pressure, as illustrated in FIG. 11 and shown in step 124. This equalized state will correspond to the external pressure on cushion 26, for example (within the limits of the system), as dictated by the distribution of weight of occupant O and resulting in a contour of cushion 26 that corresponds to the shape of the occupant O by way of the resulting inflation levels of first bladder 12a and 12b. Accordingly, once such pressure has been redistributed, such as after a designated time interval (step 124), valves 14a and 14b can be moved to the closed position (step 126) such that the resulting arrangement is maintained, including upon occupant O leaving vehicle seat 10. As discussed above, a similar customization can occur within seatback 28 either simultaneously with or independently of the depicted customization of the profile of cushion 26. Similarly alternative arrangements of both first bladders 12 and second bladders 40 can be similarly achieved.

Still further, controller 60 can allow for individual opening and closing of both first valves 14 and second valves 42, such that, upon direction of the occupant O, for example, selected ones of first bladders 12 or second bladders 40 can have pressure added thereto or subtracted therefrom. Such an arrangement can allow for individual fine-tuning of the custom arrangement achieved in steps 110-126.

It is to be understood that variations and modifications can be made on the aforementioned structure without departing from the concepts of the present invention, and further it is to be understood that such concepts are intended to be covered by the following claims unless these claims by their language expressly state otherwise.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the invention as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present invention. The exemplary structures and processes disclosed herein are for illustrative purposes and are not to be construed as limiting.

What is claimed is:

1. A vehicle seat, comprising:
a group of first inflatable bladders, each first bladder having a respective first electromechanical valve coupled therewith;
a pump coupled with each of the first valves;
an occupancy sensor; and
a controller electrically connected with the pump, the occupancy sensor, and with each of the first valves and, upon initially receiving a first signal from the occupancy sensor indicating that the seat is unoccupied, opening all of the first valves to allow air to flow between and among the first bladders and causing the pump to simultaneously inflate the group of first bladders to a predetermined collective pressure and, upon subsequently receiving a second signal from the occupancy sensor indicating that the seat occupied, simultaneously closing all of the first valves to maintain an air distribution level of each of the first bladders according to a distribution of weight of an occupant over the first bladders resulting from the seat being occupied before the controller simultaneously closes all of the first valves.

2. The vehicle seat of claim 1, further comprising:
a first manifold coupled between the pump and each of the first group of bladders; and
a first check valve coupled between the pump and the first manifold.

3. The vehicle seat of claim 1, further comprising a group of second inflatable bladders, each second bladder having a respective second electromechanical valve coupled therewith, wherein:
the pump is further coupled with each of the second valves; and
the controller is further coupled with the second valves such that, upon the pump inflating the first bladders, the second bladders are also simultaneously inflated to the predetermined collective pressure and the controller closes all of the second valves to maintain the resulting inflation level of each of the second bladders.

4. The vehicle seat of claim 3, further comprising:
a first manifold coupled between the pump and each of the first inflatable bladders;
a second manifold coupled between the pump and each of the second inflatable bladders;
a first check valve coupled between the pump and the first manifold; and
a second check valve coupled between the pump and the second manifold.

5. The vehicle seat of claim 3, further comprising: a cushion and a seatback coupled with the cushion, wherein:
the first bladders are positioned within the cushion; and
the second bladders are positioned within the seatback.

6. The vehicle seat of claim 1, wherein the controller, upon receiving the second signal from the occupancy sensor indicating that the seat a, occupied, delays for a predetermined time interval before simultaneously closing all of the first valves such that a resulting level of inflation of each of the first bladders corresponds to a distribution of weight of an occupant over the first bladders.

7. A vehicle seat, comprising:
a group of first inflatable bladders, each first bladder having a respective first electromechanical valve coupled therewith;
a first manifold coupled with each of the first bladders and providing fluidic communication among the group of first bladders when the first valves are all in respective open positions;
a pump coupled with the first manifold;
a first check valve coupled between the pump and the first manifold;
an occupancy sensor; and
a controller electrically connected with the occupancy sensor, the pump, and with each of the first electromechanical valves and, upon initially receiving a first signal from the occupancy sensor indicating that the seat is unoccupied, opening all of the first valves to allow air to flow between and among the first bladders and causing the pump to simultaneously inflate the first group of bladders to a predetermined collective pressure and, upon subsequently receiving a second signal from the occupancy sensor indicating that the seat occupied, to simultaneously close all of the first valves to maintain an air distribution level of each of the first bladders according to a distribution of weight of an occupant over the first bladders resulting from the seat being occupied before the controller simultaneously closes all of the first valves.

8. The vehicle seat of claim 7, further including a cushion and a seatback rotatably coupled with the cushion, wherein:
the group of first inflatable bladders is positioned within one of the seatback or the cushion.

9. The vehicle seat of claim 7, further comprising:
a group of second inflatable bladders, each second bladder having a respective second electromechanical valve coupled therewith;
a second manifold coupled with each of the second inflatable bladders and providing fluidic communication among the second bladders when the second valves are all in respective open positions, the second manifold being further coupled with the pump; and
a second check valve coupled between the pump and the second manifold.

10. The vehicle seat of claim 7, further comprising: a cushion and a seatback coupled with the cushion, wherein:
the first bladders are positioned within the cushion; and
the second bladders are positioned within the seatback.

11. The vehicle seat of claim 7, wherein the controller, upon detecting that the seat has been occupied, delays for a predetermined time interval before simultaneously closing all of the first valves such that the resulting level of inflation of each of the first bladders corresponds to a distribution of weight of an occupant over the first bladders.

\* \* \* \* \*